(12) United States Patent
Janevski

(10) Patent No.: US 6,988,245 B2
(45) Date of Patent: Jan. 17, 2006

(54) SYSTEM AND METHOD FOR PROVIDING VIDEOMARKS FOR A VIDEO PROGRAM

(75) Inventor: Angel Janevski, New York, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 572 days.

(21) Appl. No.: 10/174,563

(22) Filed: Jun. 18, 2002

(65) Prior Publication Data

US 2003/0231198 A1     Dec. 18, 2003

(51) Int. Cl.
*G06F 3/00*     (2006.01)

(52) U.S. Cl. ...................... 715/723; 725/144
(58) Field of Classification Search ............. 715/716, 715/723, 726, 715, 722; 725/144, 25, 27
See application file for complete search history.

(56) References Cited

U.S. PATENT DOCUMENTS

| | | | |
|---|---|---|---|
| 5,717,468 A | 2/1998 | Baryla | |
| 6,360,057 B1 | 3/2002 | Tsumagari et al. | |
| 6,493,878 B1 * | 12/2002 | Kassatly | 725/144 |
| 6,546,188 B1 * | 4/2003 | Ishii et al. | 386/52 |
| 6,842,795 B2 * | 1/2005 | Keller | 710/15 |
| 2001/0014210 A1 | 8/2001 | Kang | |

FOREIGN PATENT DOCUMENTS

| | | |
|---|---|---|
| EP | 0 838 945 A2 | 4/1998 |
| EP | 0841665 A2 | 5/1998 |
| EP | 0 982 947 A2 | 3/2000 |
| WO | WO 94/11995 | 5/1994 |
| WO | WO 99/46702 | 9/1999 |
| WO | WO 01/28238 | 4/2001 |

* cited by examiner

*Primary Examiner*—Cao (Kevin) Nguyen

(57) ABSTRACT

A system and method is disclosed comprising a videomark controller and videomark computer software for creating videomarks for a video program. When a user desires to mark an event in a video program the user sends a videomark creation command to the videomark controller. The videomark controller creates a videomark that corresponds to the time of receipt of the videomark creation command and enters a user annotation that references the content of the video program. The videomark controller is capable of creating a file that contains a plurality of videomarks for the video program. The videomarks may be displayed in a videomark menu or in a videomark timeline in which a videomark display icon represents each videomark. Each videomark may be selected to access its respective portion of the video program.

24 Claims, 8 Drawing Sheets

SYSTEM AND METHOD FOR PROVIDING VIDEOMARKS FOR A VIDEO PROGRAM

TECHNICAL FIELD OF THE INVENTION

The present invention is directed in general to video display systems, and more particularly, to a system and method for providing videomarks for a video program.

BACKGROUND OF THE INVENTION

A wide variety of video playback devices are available in the marketplace. Most people own, or are familiar with, a video cassette recorder (VCR), also referred to as a video tape recorder (VTR). More recently, video recorders that use computer magnetic hard disks rather than magnetic cassette tapes to store video programs have appeared in the market. For example, the ReplayTVJ recorder and the TiVOJ recorder digitally record television programs on hard disk drives using, for example, MPEG-2 compression. Additionally, some video playback devices may record on a readable/writable digital versatile disk (DVD) rather than a magnetic disk.

In recent years the number of video programs available for viewing has increased significantly. It is becoming increasingly important for viewers to have the ability to quickly search through a video program to find a portion of the video program (or an event in the video program) that the viewer is interested in viewing. The current options for viewers who wish to locate a desired portion of a video program in a recorded video program include (1) watching the entire video program, (2) fast forwarding through the recording of the entire video program in order to find the portion of the program that is of interest, and (3) using data from an Electronic Program Guide (EPG) that provides only a general program description.

In the analog domain video cassette recorders (VCRs) have a mechanism that allows a user to add an "index" mark to a particular point in a videotape. These analog "index" marks can be located by fast forwarding or rewinding the videotape. However, these analog "index" marks are lost when the videotape is ejected from the VCR.

In the video indexing domain a variety of methods have been developed to provide automatic indexing and video access. However, these methods do not index individual video points.

There is therefore a need in the art for a system and method that allows a user to identify the location of individual events in a video program for future access. There is also a need in the art for a system and method that allows a user to annotate the content of a video program by entering user comments.

SUMMARY OF THE INVENTION

To address the above-discussed deficiencies of the prior art, it is a primary object of the present invention to provide, for use in a video display system capable of displaying a video program, a system and method for providing videomarks for a video program.

A "videomark" comprises information that marks the location of an event within a video program. The location information within a videomark may comprise a frame number of the video program. A "videomark" may also comprise information that identifies an event within a video program. The identification information within a videomark may comprise a brief text that identifies the type of event displayed within the video program at the location of the videomark.

The present invention comprises a videomark generator that is capable of creating videomarks for a video program. The videomark generator comprises a videomark controller and videomark computer software. When a user desires to mark an event in a video program the user sends a videomark command to the videomark controller. The videomark controller creates a videomark that corresponds to the time of receipt of the videomark command and enters a user annotation that references the content of the video program. The videomark controller is capable of creating a file that contains a plurality of videomarks for the video program. Alternatively, the videomarks may be embedded at their respective locations in a file that contains the video program. The videomarks may be displayed in a videomark menu or in a videomark timeline in which a videomark display icon represents each videomark. The videomarks that are displayed may be selected by the user to access the locations in the video program that are associated with the videomarks.

According to an advantageous embodiment of the present invention, the videomark controller receives a videomark command from a user. The videomark command indicates a time during the video program when the video program displays an event that the user desires to select for videomarking. The videomark controller creates a videomark for the event that is selected by the user by associating a user annotation with the time of receipt of the videomark command.

According to an advantageous embodiment of the present invention, the videomark controller is capable of creating a plurality of videomarks for a video program.

According to an advantageous embodiment of the present invention, the videomark controller is capable of displaying videomarks for a video program in a videomark menu.

According to another advantageous embodiment of the present invention, the videomark controller is capable of displaying videomarks for a video program in a videomark timeline for a video program.

According to an advantageous embodiment of the present invention, the videomark controller is capable of receiving a videomark command from the user to select a videomark and to access the location (or locations) in the video program associated with the selected videomark.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. In particular, a controller may comprise one or more data processors, and associated input/output devices and memory, that execute one or more application programs and/or an operating system program. Definitions for certain words and phrases are provided throughout this patent document, those of ordinary skill in the art should understand that in many, if not most instances, such definitions apply to prior uses, as well as to future uses, of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 10, discussed below, and the various embodiments used to describe the principles of the present invention in this patent document are by way of illustration only and should not be construed in any way to limit the scope of the invention. In the description of the exemplary embodiment that follows, the present invention is integrated into, or is used in connection with, a television receiver. However, this embodiment is by way of example only and should not be construed to limit the scope of the present invention to television receivers. In fact, those skilled in the art will recognize that the exemplary embodiment of the present invention may easily be modified for use in any type of video display system.

Figure 1:
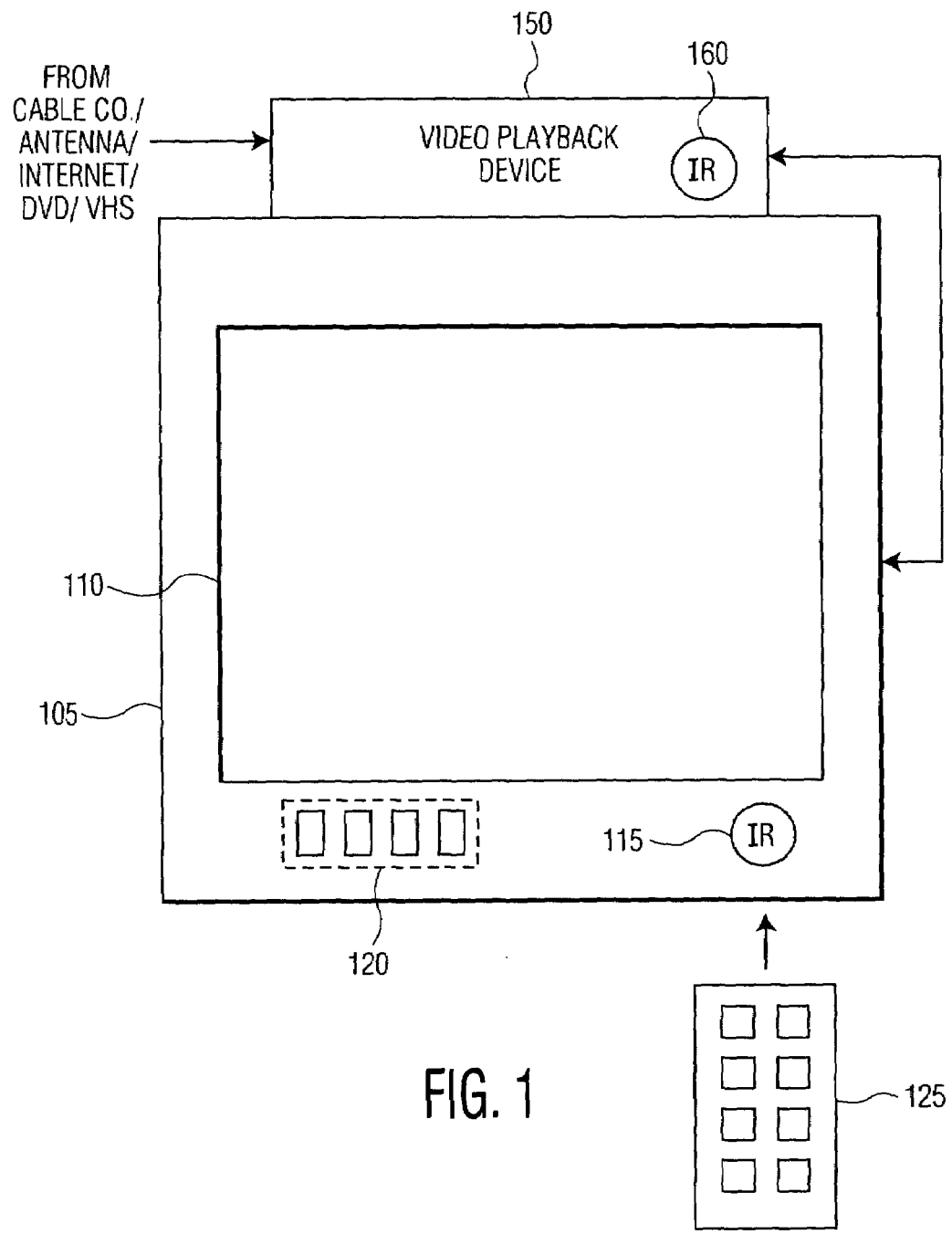
FIG. 1 illustrates an exemplary video display system.

FIG. 1 illustrates exemplary video playback device 150 and television set 105 according to an advantageous embodiment of the present invention. Video playback device 150 receives incoming television signals from an external source, such as a cable television service provider (Cable Co.), a local antenna, a satellite, the Internet, or a digital versatile disk (DVD) or a Video Home System (VHS) tape player. Video playback device 150 transmits television signals from a selected channel to television set 105. A channel may be selected manually by the viewer or may be selected automatically by a recording device previously programmed by the viewer. Alternatively, a channel and a video program may be selected automatically by a recording device based upon information from a program profile in the viewer=s personal viewing history.

In Record mode, video playback device 150 may demodulate an incoming radio frequency (RF) television signal to produce a baseband video signal that is recorded and stored on a storage medium within or connected to video playback device 150. In Play mode, video playback device 150 reads a stored baseband video signal (i.e., a program) selected by the viewer from the storage medium and transmits it to television set 105. Video playback device 150 may comprise a video recorder of the type that is capable of receiving, recording, interacting with, and playing digital signals.

Video playback device 150 may comprise a video recorder of the type that utilizes recording tape, or that utilizes a hard disk, or that utilizes solid state memory, or that utilizes any other type of recording apparatus. If video playback device 150 is a video cassette recorder (VCR), video playback device 150 stores and retrieves the incoming television signals to and from a magnetic cassette tape. If video playback device 150 is a disk drive-based device, such as a ReplayTVJ recorder or a TiVOJ recorder, video playback device 150 stores and retrieves the incoming television signals to and from a computer magnetic hard disk rather than a magnetic cassette tape, and retrieves stored television signals from the hard disk. In still other embodiments, video playback device 150 may store and retrieve from a local read/write (R/W) digital versatile disk (DVD) or a read/write (R/W) compact disk (CD-RW). The local storage medium may be fixed (e.g., hard disk drive) or may be removable (e.g., DVD, CD-RW).

Video playback device 150 comprises infrared (IR) sensor 160 that receives commands (such as Channel Up, Channel Down, Volume Up, Volume Down, Record, Play, Fast Forward (FF), Reverse, and the like) from remote control device 125 operated by the viewer. Television set 105 is a conventional television comprising screen 110, infrared (IR) sensor 115, and one or more manual controls 120 (indicated by a dotted line). IR sensor 115 also receives commands (such as Volume Up, Volume Down, Power On, Power Off) from remote control device 125 operated by the viewer.

Alternatively, remote control device 125 may be coupled to video playback device 150 (and television set 105) by wire instead of through an infrared (IR) link. Also alternatively, remote control device 125 may comprise a keyboard (not shown) and a display (not shown) to enable the user to type and send text messages to video playback device 150. As will be more fully described, in one alternate advantageous embodiment of the present invention the user can send text messages to video playback device 150 to edit videomark annotations.

It should be noted that video playback device 150 is not limited to receiving a particular type of incoming television signal from a particular type of source. As noted above, the external source may be a cable service provider, a conventional RF broadcast antenna, a satellite dish, an Internet connection, or another local storage device, such as a DVD player or a VHS tape player. In some embodiments, video playback device 150 may not even be able to record, but may be limited to playing back television signals that are retrieved from a removable DVD or CD-ROM. Thus, the incoming signal may be a digital signal, an analog signal, or Internet protocol (IP) packets. However, for purposes of simplicity and clarity in explaining the principles of the present invention, the descriptions that follow shall generally be directed to an embodiment in which video playback device 150 receives incoming television signals (analog and/or digital) from a cable service provider. Nonetheless, those skilled in the art will understand that the principles of the present invention may readily be adapted for use with wireless broadcast television signals, local storage systems, an incoming stream of IP packets containing MPEG data, and the like.

Figure 2:
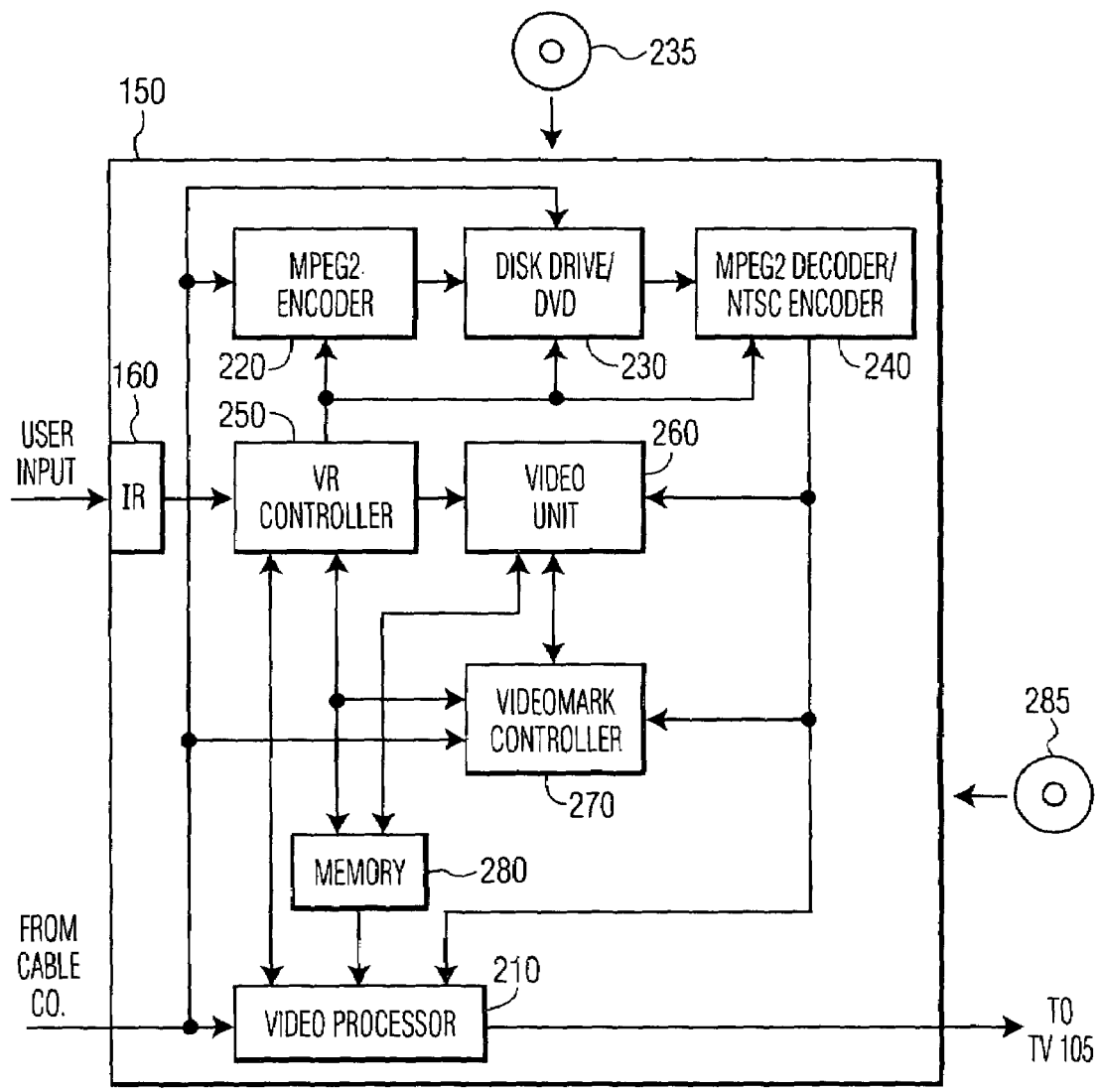
FIG. 2 illustrates an advantageous embodiment of a system for generating videomarks for a video program in the exemplary video display system shown in FIG. 1.

FIG. 2 illustrates exemplary video playback device 150 in greater detail according to an advantageous embodiment of the present invention. Video playback device 150 comprises IR sensor 160, video processor 210, MPEG2 encoder 220, hard disk drive 230, MPEG2 decoder/NTSC encoder 240, and video recorder (VR) controller 250. Video playback device 150 further comprises video unit 260, videomark controller 270, and memory 280. VR controller 250 directs the overall operation of video playback device 150, including View mode, Record mode, Play mode, Fast Forward (FF) mode, Reverse mode, and other similar functions. VR controller 250 also directs the creation, storage, and display of videomarks in accordance with the principles of the present invention.

In View mode, VR controller 250 causes the incoming television signal from the cable service provider to be demodulated and processed by video processor 210 and transmitted to television set 105, with or without storing video signals on (or retrieving video signals from) hard disk drive 230. Video processor 210 contains radio frequency (RF) front-end circuitry for receiving incoming television signals from the cable service provider, tuning to a user-selected channel, and converting the selected RF signal to a baseband television signal (e.g., super video signal) suitable for display on television set 105. Video processor 210 also is capable of receiving a conventional NTSC signal from MPEG2 decoder/NTSC encoder 240 and videomarks from memory 280 and transmitting a baseband television signal to television set 105.

In Record mode, VR controller 250 causes the incoming television signal to be stored on hard disk drive 230. Under the control of VR controller 250, MPEG2 encoder 220 receives an incoming analog television signal from the cable service provider and converts the received RF signal to MPEG format for storage on hard disk drive 230. Alternatively, if video playback device 150 is coupled to a source that is transmitting MPEG2 data, the incoming MPEG2 data may bypass MPEG2 encoder 220 and be stored directly on hard disk drive 230.

In Play mode, VR controller 250 directs hard disk drive 230 to stream the stored television signal (i.e., a program) to MPEG2 decoder/NTSC encoder 240, which converts the MPEG2 data from hard disk drive 230 to, for example, a super video (S-Video) signal that video processor 210 transmits to television set 105.

It should be noted that the choice of the MPEG2 standard for MPEG2 encoder 220 and MPEG2 decoder/NTSC encoder 240 is by way of illustration only. In alternate embodiments of the present invention, the MPEG encoder and decoder may comply with one or more of the MPEG-1, MPEG-2, MPEG-4, and MPEG-7 standards, or with one or more other types of standards.

For the purposes of this application and the claims that follow, hard disk drive 230 is defined to include any mass storage device that is both readable and writable, including, but not limited to, conventional magnetic disk drives and optical disk drives for read/write digital versatile disks (DVD-RW), re-writable CD-ROMs, VCR tapes and the like. In fact, hard disk drive 230 need not be fixed in the conventional sense that it is permanently embedded in video playback device 150. Rather, hard disk drive 230 includes any mass storage device that is dedicated to video playback device 150 for the purpose of storing recorded video programs. Thus, hard disk drive 230 may include an attached peripheral drive or removable disk drives (whether embedded or attached), such as a juke box device (not shown) that holds several read/write DVDs or re-writable CD-ROMs. As illustrated schematically in FIG. 2, removable disk drives of this type are capable of receiving and reading re-writable CD-ROM disk 235.

Furthermore, in an advantageous embodiment of the present invention, hard disk drive 230 may include external mass storage devices that video playback device 150 may access and control via a network connection (e.g., Internet protocol (IP) connection), including, for example, a disk drive in the viewer=s home personal computer (PC) or a disk drive on a server at the viewer's Internet service provider (ISP).

VR controller 250 obtains information from video processor 210 concerning video signals that are received by video processor 210. When VR controller 250 determines that video playback device 150 is receiving a video program, VR controller 250 determines if the video program is one that has been selected to be recorded. If the video program is to be recorded, then VR controller 250 causes the video program to be recorded on hard disk drive 230 in the manner previously described. If the video program is not to be recorded, then VR controller 250 causes the video program to be processed by video processor 210 and transmitted to television set 105 in the manner previously described.

In an exemplary embodiment of the present invention, memory 280 may comprise random access memory (RAM) or a combination of random access memory (RAM) and read only memory (ROM). Memory 280 may comprise a non-volatile random access memory (RAM), such as flash memory. In an alternate advantageous embodiment of television set 105, memory 280 may comprise a mass storage data device, such as a hard disk drive (not shown). Memory 280 may also include an attached peripheral drive or removable disk drives (whether embedded or attached) that reads read/write DVDs or re-writable CD-ROMs. As illustrated schematically in FIG. 2, removable disk drives of this type are capable of receiving and reading re-writable CD-ROM disk 285.

As previously mentioned, a videomark comprises information that marks the location of an event within a video program. The location information within a videomark may comprise a frame number of the video program. A videomark may also comprise information that identifies an event within a video program. The identification information within a videomark may comprise a brief text that identifies the type of event displayed within the video program at the location of the videomark.

Figure 3:
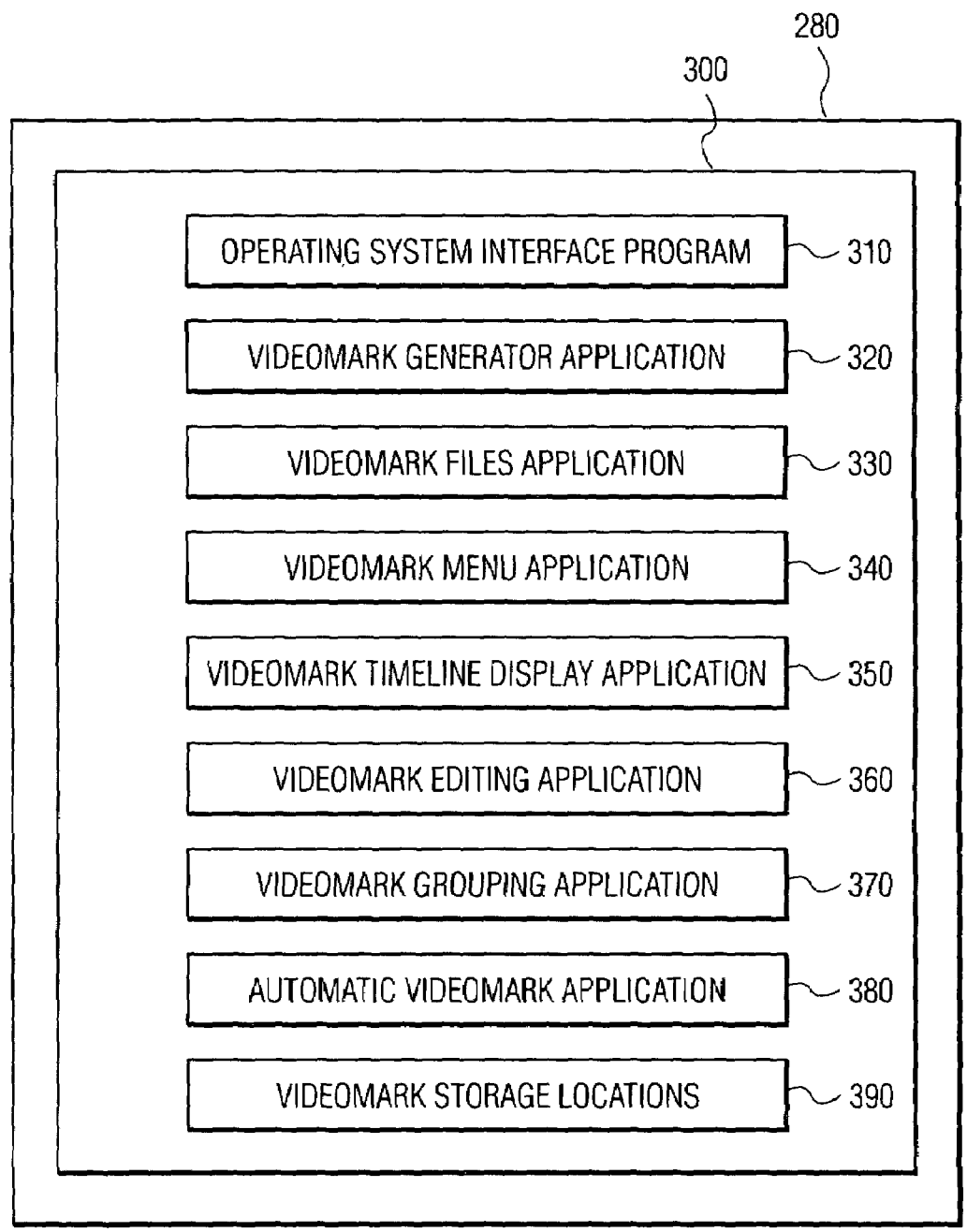
FIG. 3 illustrates videomark computer software used with an advantageous embodiment of the present invention.

FIG. 3 illustrates a selected portion of memory 280 that contains videomark computer software 300 of the present invention. Memory 280 contains operating system interface program 310, videomark generator application 320, videomark files application 330, videomark menu application 340, videomark timeline display application 350, videomark editing application 360, videomark grouping application 370, automatic videomark application 380, and videomark storage locations 390. Videomark controller 270 and videomark computer software 300 together comprise a videomark generator that is capable of carrying out the present invention. Operating system interface program 310 coordinates the operation of computer software 300 with the operating system of VR controller 250 and videomark controller 270.

As will be more fully described, under the direction of instructions in computer software 300 stored within memory 280, videomark controller 270 is capable of (1) receiving user input to request the creation of a videomark, (2) creating a videomark for a video program in response to the user input, (3) storing a videomark in a videomark storage location, and (4) displaying a plurality of videomarks in a videomark menu, (5) displaying a plurality of videomarks in a videomark timeline during the display of the video program, (6) selecting a videomark from a display of a plurality of videomarks in response to a user request, (7) displaying a portion of a video program that is associated with a selected videomark, (8) editing, saving and deleting videomarks, (9) grouping related videomarks, and (10) automatically generating videomarks in response to actions or inactions of a user.

Video recorder (VR) controller 250 receives a command from a user to create a videomark. A user command to create a videomark will be referred to as a videomark creation command. The user sends a videomark creation command to VR controller 250 via remote control device 125 and IR sensor 160. The videomark creation command may comprise an annotation signal that indicates a particular annotation that the user desires to be added to the videomark. The annotation may identify the content of the video program (e.g., "cool scene") or may record an external event of the user (e.g., "gone to bed"). The user may send an annotation signal using one or more control buttons on remote control device 125. Alternatively, the user may use a remote control device 125 that is equipped with a keyboard and display to send a customized text message to be used as the annotation for the videomark.

Standard videomarks are videomarks that have been previously created for use with video controller 270. A standard videomark comprises a video icon and a corresponding videomark annotation. Video controller 270 is programmed to receive and recognize all standard videomarks. For example, a standard videomark may comprise a videomark icon with a videomark annotation such as "cool scene," "music," "show to my friends," "great action," "scored points," etc. Libraries of standard videomarks may be created for videomark users. For example, a user may access one or more libraries of standard videomarks on the Internet and download as many standard videomarks to video controller 270 as desired. Alternatively, the user may order "off line" one or more libraries of standard videomarks from a third party provider of standard videomarks.

Customized videomarks are videomarks that have been created by a user for specific individual applications. A customized videomark comprises a video icon and a corresponding customized videomark annotation. Video controller 270 is programmed to receive user input to create a customized videomark. For example, a customized videomark may comprise a videomark icon with a customized videomark annotation such as "Middle East Crisis", "Star Trek", "Dolly Parton," etc. The user can create customized videomarks using videomark editing application 360. As previously described, the user may send the text of a customized videomark application using a keyboard equipped remote control unit 125.

When video recorder (VR) controller 250 receives a videomark creation command from the user, VR controller 250 sends the videomark creation command and the time of receipt of the videomark creation command to videomark controller 270. In response to receiving a videomark creation command, videomark controller 270 creates a videomark using videomark generator application 320. Videomark controller 270 uses a time stamp to identify a selected key frame of video corresponding to the time that the videomark creation command was received.

Videomark controller 270 also identifies a signal that indicates an annotation from the user. For example, assume that the user sends a signal that identifies the videomark as one that the user wishes to use to denote a "cool scene" in the video program. Then videomark controller 270 will identify the annotation signal and add the "cool scene" annotation to the videomark. Alternatively, the user may send a customized videomark annotation with the words "cool scene" in the text of the annotation.

Videomark controller 270 stores the videomark in a videomark file using videomark files application 330. Videomark controller 270 stores the videomark file in one of the videomark storage locations 360. Videomark controller 270 updates the videomark file for the video program as new videomarks are created.

Figure 4:
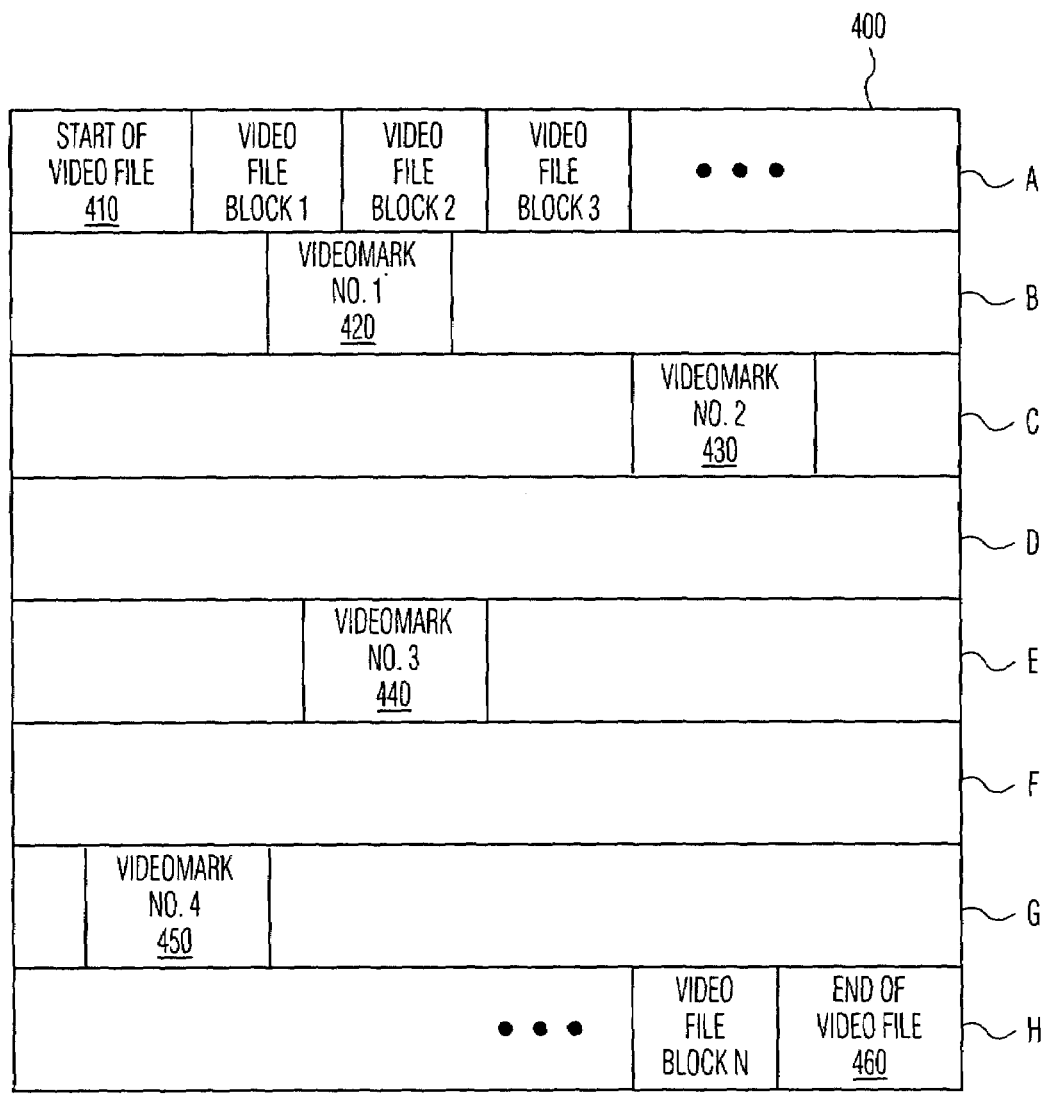
FIG. 4 illustrates an exemplary video file containing a plurality of embedded videomarks created by an advantageous embodiment of the videomark generator of the present invention.

As a video program is being recorded on hard disk drive 230 VR controller 250 may obtain videomarks from videomark controller 270 and insert them into the recorded video program file. FIG. 4 illustrates an exemplary video file 400 comprising a video file and a plurality of embedded videomarks (420, 430, 440, 450) that were created by videomark controller 270. The start of the video file is shown as block 410 and the end of the video file is shown as block 460. The video program portion of video file 400 is represented by sequential video blocks (Video Block 1 through Video Block N) that run from Row A through Row H of FIG. 4.

In video file 400 embedded videomark 420 (Videomark No.1) is on Row B, embedded videomark 430 (Videomark No.2) is on Row C, embedded videomark 440 (Videomark No.3) is on Row E, and embedded videomark 450 (Videomark No.4) is on Row G.

Figure 5:
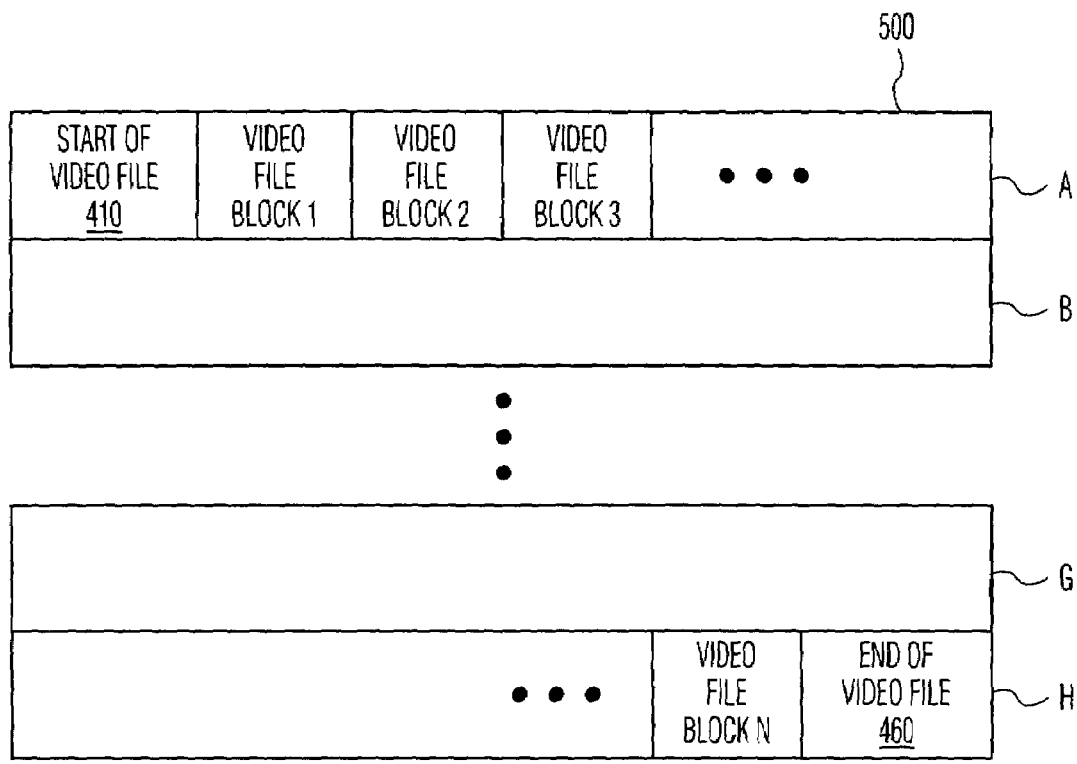
FIG. 5 illustrates the exemplary video file shown in FIG. 4 without videomarks.
Figure 6:
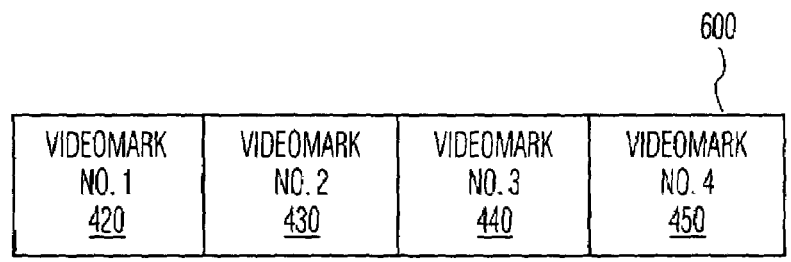
FIG. 6 illustrates a videomark file containing a copy of the videomarks embedded in the exemplary video file shown in FIG. 4.

As previously mentioned, videomark controller 270 is capable of storing the videomarks in a separate file. For example, FIG. 5 illustrates an exemplary video file 500 that comprises the exemplary video file 400 shown in FIG. 4 without the embedded videomarks (420, 430, 440, 450). FIG. 6 illustrates an exemplary videomark file 600 containing a copy of the videomarks (420, 430, 440, 450) that are embedded in the exemplary video file 400 shown in FIG. 4. Videomark controller 270 is capable of sending the videomark file 600 to a remote location. This allows a user to send his or her annotated videomarks to a friend via any suitable computer communication channel. The friend can then use the videomarks in videomark file 600 to access the videomarked points in the video program.

Figures 7, 8:
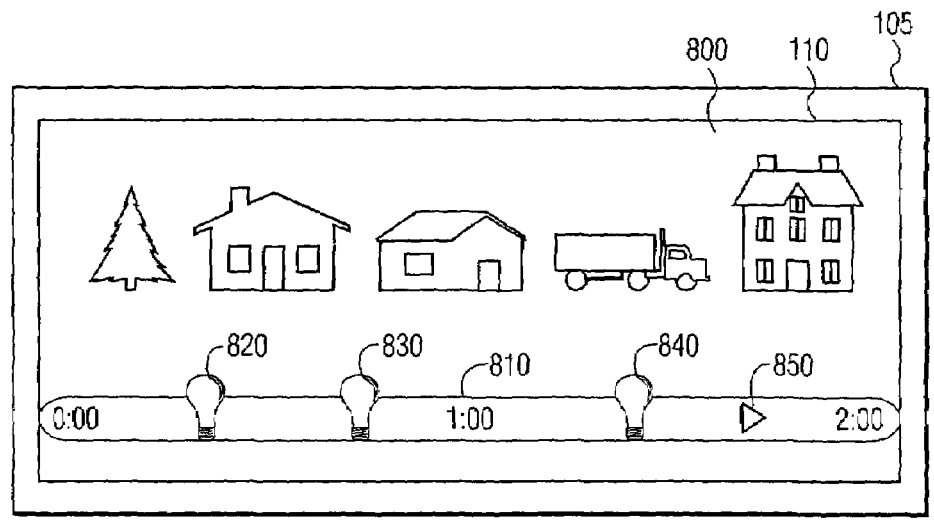
FIG. 7 illustrates an exemplary videomark menu.
FIG. 8 illustrates an exemplary display format of a video program showing an advantageous embodiment of a videomark timeline displayed at the bottom of the video display.

Videomark controller 270 is capable of displaying videomarks in a videomark menu using videomark menu application 340. FIG. 7 illustrates an exemplary videomark menu 700. FIG. 7 illustrates how videomarks for a video program may be displayed. Although only one page is shown, additional pages may be added. Videomark menu 700 displays the title of the video program as "Star Trek: First Contact." The first videomark occurs twelve minutes and thirty seconds (12:30) from the beginning of the video program. The user annotation of "cool scene" is displayed next to a display icon of an award ribbon. A second videomark in videomark menu 700 occurs twenty four minutes and thirty three seconds (24:33) from the beginning of the video program. In the second videomark the user annotation "check it out again" is displayed next to a display icon of a magnifying glass. A third videomark in videomark menu 700 occurs one hour thirty three minutes and three seconds (1:33:03) from the beginning of the video program. In the third videomark the user annotation "gone to bed" is displayed next to a display icon of a stop sign.

Videomark controller 270 is also capable of displaying videomarks in a videomark timeline using videomark timeline display application 350. FIG. 8 illustrates an exemplary display format 800 of a video program showing an advantageous embodiment of a videomark timeline 810 displayed at the bottom of video display format 800. Videomark timeline 810 is displayed while the video program is being displayed on screen 110 of television set 105. The first videomark is represented by a display icon of light bulb 820 located at a position on videomark timeline 810 that represents a time that occurs twelve minutes and thirty seconds (12:30) from the beginning of the video program.

The second videomark is represented by a display icon of light bulb 830 located at a position on videomark timeline 810 that represents a time that occurs twenty four minutes and thirty three seconds (24:33) from the beginning of the video program. Similarly, the third videomark is represented by a display icon of light bulb 840 located at a position on videomark timeline 810 that represents a time that occurs one hour thirty three minutes and three seconds (1:33:03) from the beginning of the video program. Triangle 850 represents a time along videomark timeline 810 associated with the video scene currently being displayed on screen 110 of television set 105.

Figure 9:
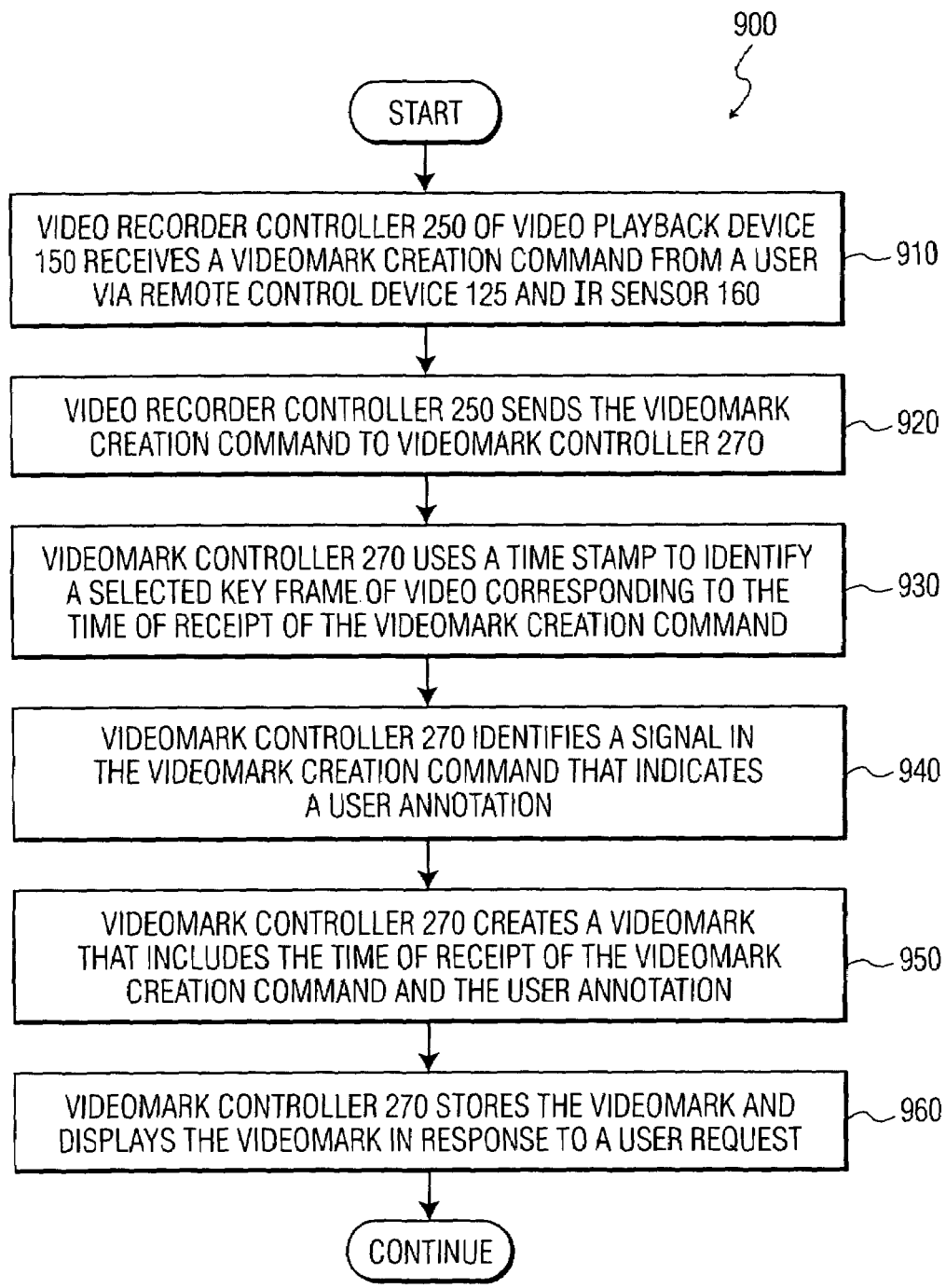
FIG. 9 is a flow chart illustrating an advantageous embodiment of a method of the present invention for providing videomarks for a video program.

FIG. 9 depicts flow diagram 900 illustrating the operation of the method of an advantageous embodiment of the present invention for creating videomarks. Video recorder (VR) controller 250 of video playback device 150 receives a videomark command from a user via remote control device 125 and IR sensor 160 (step 910). Video recorder (VR) controller 250 sends the videomark command to videomark controller 270 (step 920). Videomark controller 270 uses a time stamp to identify a selected key frame of the video corresponding to the time of receipt of the videomark command (step 930). Videomark controller 270 then identifies a signal in the videomark command that indicates a user annotation (step 940). Videomark controller 270 then creates a videomark that includes the time of receipt of the videomark command and the user annotation (step 950). Videomark controller 270 then stores the videomark and displays the videomark in response to a user request (step 960).

When a user desires to access a portion of a video program that is associated with a videomark, the user sends a command to video recorder controller 250 to select the videomark. A command to select a videomark will be referred to as a videomark selection command. The user sends a videomark selection command to VR controller 250 via remote control device 125 and IR sensor 160. The videomark selection command comprises a signal that identifies the desired videomark from a plurality of videomarks displayed in a videomark menu or a videomark timeline.

Video recorder controller 250 sends the videomark selection command to videomark controller 270. Videomark controller 270 then selects the identified videomark from the displayed videomarks. Videomark controller 270 then accesses a location of the portion of the video program that is associated with the selected videomark. Videomark controller 270 then causes video recorder controller 250 to display on television set 105 the portion of the video program that is associated with the selected videomark.

Figure 10:
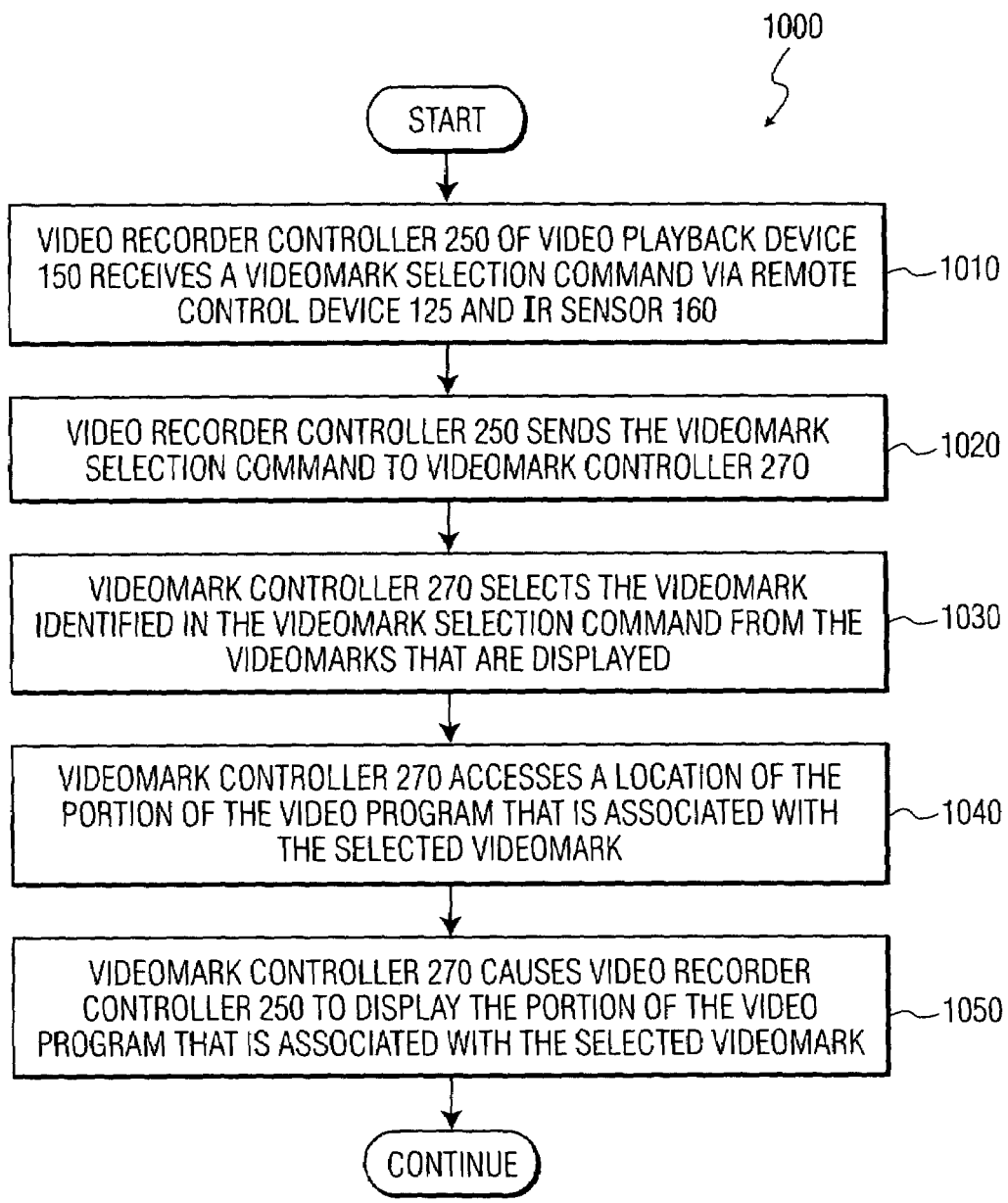
FIG. 10 is a flow chart illustrating an advantageous embodiment of a method of the present invention for accessing and displaying a portion of a video program associated with a videomark.

FIG. 10 depicts flow diagram 1000 illustrating the operation of the method of an advantageous embodiment of the present invention for creating for accessing and displaying a portion of a video program associated with a videomark. Video recorder (VR) controller 250 of video playback device 150 receives a videomark selection command from a user via remote control device 125 and IR sensor 160 (step 1010). Video recorder (VR) controller 250 sends the videomark selection command to videomark controller 270 (step 1020). Videomark controller 270 selects the videomark that is identified in the videomark selection command from the videomarks that are displayed (step 1030). Videomark controller 270 then accesses a location of the portion of the video program that is associated with the selected videomark (step 1040). Videomark controller 270 then causes video recorder (VR) controller to display the portion of the video program that is associated with the selected program (step 1050).

The user may modify an existing videomark using videomark editing application 360. The user may change the text of a videomark annotation by sending a new annotation text to videomark controller 270 using a keyboard equipped remote control unit 125. Videomark controller 270 changes the text of the annotation in the selected videomark in response to the user request. The user may also send an instruction to videomark controller 270 to change a videomark icon of a videomark. The user may then send an instruction to videomark controller 270 to save the modified videomark. The user may also send an instruction to videomark controller 270 to delete a videomark.

Videomark controller 270 may also display a special "editing" videomark. When the "editing" videomark is accessed, video controller 270 enters an "edit" mode. The user can then make the modification of videomarks described above while in "editing" mode.

Videomark controller 270 may also display a special "supplemental" videomark. When the "supplemental" videomark is accessed, video controller 270 accesses and downloads additional standard videomarks from the Internet.

Videomark controller 270 may also group two or more videomarks using videomark grouping application 370. For example, a first videomark may mark the beginning of a particular video segment and a second videomark may mark the end of the video segment. The first videomark contains location information for the second videomark (i.e., a pointer to the second videomark) Similarly, the second videomark contains location information for the first videomark (i.e., a pointer to the first videomark) Videomark controller 270 may group the first and second videomarks and designate the video segment between the first and second videomarks with a third videomark. In this manner a single videomark (i.e., the third videomark) would designate the video segment. Videomark controller 270 (1) receives user input to identify the beginning and the end of the video segment, and (2) uses videomark grouping application 370 to create a group videomark to designate the entire video segment. The group videomark essentially identifies two locations in the video program.

In a similar manner, a group videomark may be created that identifies more than two locations in a video program. For example, consider a video program of a baseball game that contains five home runs. A group "home run" videomark may be created that contains pointers to each of the video segments that contain a home run. That is, the group "home run" videomark contains the beginning and end location of each of the "home run" video segments. Videomark controller 270 (1) receives user input to identify the beginning and the end of each of the five "home run" video segments, and (2) uses videomark grouping application 370 to create a group videomark to designate the five "home run" video segment. The group videomark essentially identifies the five "home run" locations in the video program.

Videomark controller 270 may execute videomark grouping application 370 multiple times to create multiple layers of videomarks. For example, a group videomark at a first level may point to three videomarks on a next lower level. Each of the three videomarks on that next lower level may point to additional videomarks on a next lower level, and so on. Each videomark in the hierarchy of videomarks contains information that locates the other videomarks that it is connected to.

Videomark controller 270 may also automatically create videomarks using automatic videomark application 380. In addition to the videomarks created by the user, videomark controller 270 may create videomarks that designate events that occur due to actions or inactions of the user. For example, videomark controller 270 may execute automatic videomark application 380 to create a videomark that states "video program was paused at this location for over thirty minutes." Such automatically created videomarks could be accessible by the user at the highest level of videomarks within the system. Alternatively, videomark controller 270 could group the automatically created videomarks under a single videomark called "system videomarks."

Automatic videomarks may also be used to designate when a user gives a "fast-forward" command to fast forward a recorded video program and when the user gives an "end fast-forward" command. The location of the "fast-forward" and the location of the "end fast-forward" may be automatically videomarked and presented to the user for an appropriate videomark annotation. For example, the user may provide a videomark annotation that reads "boring part of the game" to identify the portion of the video program that was skipped by fast forwarding.

Although the present invention has been described in detail, those skilled in the art should understand that they can make various changes, substitutions and alterations herein without departing from the spirit and scope of the invention in its broadest form.

What is claimed is:

1. An apparatus for creating a videomark for a video program in a video display system capable of displaying said video program, said apparatus comprising:
    a videomark generator capable of receiving a videomark creation command from a user in which said videomark creation command indicates a time during said video program when said video program displays an event selected by said user,
    wherein said videomark generator is capable of creating said videomark for said video program and associating with said videomark a time of receipt of said videomark creation command from said user, and
    wherein said videomark generator is capable of receiving an annotation from said user and associating said annotation from said user with said videomark.

2. The apparatus as claimed in claim 1 wherein said videomark generator comprises:
    a videomark controller capable of executing computer software instructions contained within a memory coupled to said videomark controller to create a plurality of videomarks for said video program by receiving from said user a plurality of videomark creation commands wherein each videomark creation command of said plurality of videomark creation commands comprises a time of receipt of said videomark creation command and an annotation from said user, and
    wherein said videomark controller is capable of creating one of: a first file that contains said plurality of videomarks for said video program and a second file that comprises said video program and said plurality of videomarks wherein each videomark of said plurality of videomarks is located within said second file at a location that corresponds to a time of receipt of a videomark creation command from said user for said videomark.

3. The apparatus as claimed in claim 2 wherein said videomark controller is capable of executing computer software instructions contained within a memory coupled to said videomark controller to display said plurality of videomarks in one of:
    a videomark menu for said video program in which each entry in said videomark menu comprises a time of receipt of a videomark creation command from said user for said videomark and an annotation from said user; and
    a videomark timeline for said video program in which a videomark display icon is displayed for each videomark of said plurality of videomarks at a point on said videomark timeline that corresponds to a location within said video program when a videomark creation command was received from said user for said videomark.

4. The apparatus as claimed in claim 3 wherein said videomark controller is capable of executing computer software instructions contained within a memory coupled to said videomark controller to receive a videomark selection command from said user that selects a videomark from said plurality of videomarks, and
    wherein in response to receiving said videomark selection command, said videomark controller is capable of accessing and displaying a portion of said video program associated with said selected videomark of said plurality of videomarks.

5. The apparatus as claimed in claim 4 wherein said videomark controller is capable of executing computer software instructions contained within a memory coupled to said videomark controller to receive a videomark selection command from said user that selects a videomark from said plurality of videomarks when said plurality of videomarks are displayed in one of: a videomark menu and a videomark timeline for said video program in which a videomark display icon is displayed for each videomark of said plurality of videomarks at a point on said videomark timeline that corresponds to a location within said video program when a videomark creation command was received from said user for said videomark.

6. The apparatus as claimed in claim 3 wherein said videomark controller is capable of executing computer software instructions contained within a memory coupled to said videomark controller to one of: edit a videomark, save a videomark, add a videomark, delete a videomark, associate at least two videomarks in a video group, associate at least two videomarks in more than one videomark layer, automatically create a videomark in response to an action taken by a user, and automatically create a videomark in response to an absence of an action taken by a user.

7. A video display system capable of displaying a video program, said video display system comprising:
   a videomark generator capable of receiving a videomark creation command from a user in which said videomark creation command indicates a time during said video program when said video program displays an event selected by said user,
   wherein said videomark generator is capable of creating said videomark for said video program and associating with said videomark a time of receipt of said videomark creation command from said user, and
   wherein said videomark generator is capable of receiving an annotation from said user and associating said annotation from said user with said videomark.

8. The video display system as claimed in claim 7 wherein said videomark generator comprises:
   a videomark controller capable of executing computer software instructions contained within a memory coupled to said videomark controller to create a plurality of videomarks for said video program by receiving from said user a plurality of videomark creation commands wherein each videomark creation command of said plurality of videomark creation commands comprises a time of receipt of said videomark creation command and an annotation from said user, and
   wherein said videomark controller is capable of creating one of: a first file that contains said plurality of videomarks for said video program and a second file that comprises said video program and said plurality of videomarks wherein each videomark of said plurality of videomarks is located within said second file at a location that corresponds to a time of receipt of a videomark creation command from said user for said videomark.

9. The video display system as claimed in claim 8 wherein said videomark controller is capable of executing computer software instructions contained within a memory coupled to said videomark controller to display said plurality of videomarks in one of:
   a videomark menu for said video program in which each entry in said videomark menu comprises a time of receipt of a videomark creation command from said user for said videomark and an annotation from said user; and
   a videomark timeline for said video program in which a videomark display icon is displayed for each videomark of said plurality of videomarks at a point on said videomark timeline that corresponds to a location within said video program when a videomark creation command was received from said user for said videomark.

10. The video display system as claimed in claim 9 wherein said videomark controller is capable of executing computer software instructions contained within a memory coupled to said videomark controller to receive a videomark selection command from said user that selects a videomark from said plurality of videomarks, and
   wherein in response to receiving said videomark selection command, said videomark controller is capable of accessing and displaying a portion of said video program associated with said selected videomark of said plurality of videomarks.

11. The video display system as claimed in claim 10 wherein said videomark controller is capable of executing computer software instructions contained within a memory coupled to said videomark controller to receive a videomark selection command from said user that selects a videomark from said plurality of videomarks when said plurality of videomarks are displayed in one of: a videomark menu and a videomark timeline for said video program in which a videomark display icon is displayed for each videomark of said plurality of videomarks at a point on said videomark timeline that corresponds to a location within said video program when a videomark creation command was received from said user for said videomark.

12. The video display system as claimed in claim 9 wherein said videomark controller is capable of executing computer software instructions contained within a memory coupled to said videomark controller to one of: edit a videomark, save a videomark, add a videomark, delete a videomark, associate at least two videomarks in a video group, associate at least two videomarks in more than one videomark layer, automatically create a videomark in response to an action taken by a user, and automatically create a videomark in response to an absence of an action taken by a user.

13. A method for creating a videomark for a video program in a video display system capable of displaying said video program, said method comprising the steps of:
   receiving in a videomark generator a videomark creation command from a user in which said videomark creation command indicates a time during said video program when said video program displays an event selected by said user;
   creating said videomark for said video program in said videomark generator in response to said videomark creation command;
   associating with said videomark a time of receipt of said videomark creation command from said user;
   receiving an annotation from said user; and
   associating said annotation from said user with said videomark.

14. The method as claimed in claim 13 further comprising the steps of:
   receiving from said user a plurality of videomark creation commands for said video program wherein each videomark creation command of said plurality of videomark creation commands comprises a time of receipt of said videomark creation command and an annotation from said user; and creating one of:
   a first file that contains said plurality of videomarks for said video program; and
   a second file that comprises said video program and said plurality of videomarks wherein each videomark of said plurality of videomarks is located within said second file at a location that corresponds to a time of receipt of a videomark creation command from said user for said videomark.

15. The method as claimed in claim 14 further comprising the steps of:
   displaying said plurality of videomarks in a videomark menu for said video program in which each entry in said videomark menu comprises a time of receipt of a videomark command from said user for said videomark and an annotation from said user; and displaying said plurality of videomarks on a videomark timeline for said video program in which a videomark display icon is displayed for each videomark of said plurality of videomarks at a point on said videomark timeline that corresponds to a location within said video program when a videomark command was received from said user for said videomark.

16. The method as claimed in claim 15 further comprising the steps of:

receiving a videomark selection command from said user that selects a videomark from a plurality of videomarks that are displayed in one of: said videomark menu and said videomark timeline;

accessing a portion of said video program associated with said selected videomark; and displaying said portion of said video program.

17. The method as claimed in claim 15 further comprising the step of one of:

editing a videomark;

saving a videomark;

adding a videomark;

deleting a videomark;

associating at least two videomarks in a videomark group;

associating at least two videomarks in more than one videomark layer;

automatically creating a videomark in response to an action taken by a user; and automatically creating a videomark in response to an absence of an action taken by a user.

18. The method as claimed in claim 14 further comprising the steps of:

receiving a videomark selection command from said user that selects a videomark from said plurality of videomarks;

accessing a portion of said video program associated with said selected videomark; and displaying said portion of said video program.

19. Computer-executable instructions stored on a computer-readable storage medium for creating a videomark for a video program in a video display system capable of displaying said video program, said computer-executable instructions comprising the steps of:

receiving in a videomark generator a videomark creation command from a user in which said videomark creation command indicates a time during said video program when said video program displays an event selected by said user;

creating said videomark for said video program in said videomark generator in response to said videomark creation command;

associating with said videomark a time of receipt of said videomark creation command from said user;

receiving an annotation from said user; and associating said annotation from said user with said videomark.

20. The computer-executable instructions stored on a computer-readable storage medium as claimed in claim 19 wherein said computer-executable instructions further comprise the steps of:

receiving from said user a plurality of videomark creation commands for said video program wherein each videomark creation command of said plurality of videomark creation commands comprises a time of receipt of said videomark creation command and an annotation from said user; and creating one of:

a first file that contains said plurality of videomarks for said video program; and a second file that comprises said video program and said plurality of videomarks wherein each videomark of said plurality of videomarks is located within said second file at a location that corresponds to a time of receipt of a videomark creation command from said user for said videomark.

21. The computer-executable instructions stored on a computer-readable storage medium as claimed in claim 20 wherein said computer-executable instructions further comprise the steps of:

displaying said plurality of videomarks in a videomark menu for said video program in which each entry in said videomark menu comprises a time of receipt of a videomark command from said user for said videomark and an annotation from said user; and displaying said plurality of videomarks on a videomark timeline for said video program in which a videomark display icon is displayed for each videomark of said plurality of videomarks at a point on said videomark timeline that corresponds to a location within said video program when a videomark command was received from said user for said videomark.

22. The computer-executable instructions stored on a computer-readable storage medium as claimed in claim 21 wherein said computer-executable instructions further comprise the steps of:

receiving a videomark selection command from said user that selects a videomark from said plurality of videomarks;

accessing a portion of said video program associated with said selected videomark; and displaying said portion of said video program.

23. The computer-executable instructions stored on a computer-readable storage medium as claimed in claim 21 wherein said computer-executable instructions further comprise the step of one of:

editing a videomark;

saving a videomark;

adding a videomark;

deleting a videomark;

associating at least two videomarks in a videomark group;

associating at least two videomarks in more than one videomark layer;

automatically creating a videomark in response to an action taken by a user; and automatically creating a videomark in response to an absence of an action taken by a user.

24. The computer-executable instructions stored on a computer-readable storage medium as claimed in claim 20 wherein said computer-executable instructions further comprise the steps of:

receiving a videomark selection command from said user that selects a videomark from said plurality of videomarks;

accessing a portion of said video program associated with said selected videomark; and displaying said portion of said video program.

* * * * *